United States Patent
Shah et al.

(10) Patent No.: US 11,072,428 B2
(45) Date of Patent: Jul. 27, 2021

(54) RECONFIGURABLE MODULAR IN-VEHICLE ENTERTAINMENT MONITOR SYSTEMS

(71) Applicant: Panasonic Avionics Corporation, Lake Forest, CA (US)

(72) Inventors: Shrenik Shah, San Juan Capistrano, CA (US); Feng Jiang, Irvine, CA (US); Gary Chen, Rancho Santa Margarita, CA (US); Vic Wu, Irvine, CA (US); Xinyu Li, Irvine, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 4 days.

(21) Appl. No.: 16/562,335

(22) Filed: Sep. 5, 2019

(65) Prior Publication Data

US 2021/0070450 A1   Mar. 11, 2021

(51) Int. Cl.
*B64D 11/06* (2006.01)
*B64D 11/00* (2006.01)
*B60N 3/00* (2006.01)

(52) U.S. Cl.
CPC .......... *B64D 11/0624* (2014.12); *B60N 3/004* (2013.01); *B64D 11/00152* (2014.12); *B64D 11/0605* (2014.12); *B64D 11/0638* (2014.12)

(58) Field of Classification Search
CPC .......... B64D 11/0624; B64D 11/00152; B64D 11/0605; B64D 11/0638; B60N 3/004
See application file for complete search history.

(56) References Cited

U.S. PATENT DOCUMENTS

| | | | |
|---|---|---|---|
| 10,326,299 B2* | 6/2019 | Jouper | B64D 11/00152 |
| 10,843,613 B2* | 11/2020 | Smith | B64D 11/0624 |
| 2006/0146656 A1* | 7/2006 | Laraia | G11B 5/09 |
| | | | 369/30.01 |
| 2006/0175882 A1 | 8/2006 | Schweizer | |
| 2016/0249073 A1 | 8/2016 | Margis et al. | |
| 2016/0355263 A1 | 12/2016 | Pozzi et al. | |
| 2017/0210472 A1* | 7/2017 | Salazar | B64D 11/00152 |
| 2019/0176989 A1 | 6/2019 | Flores Aguirre et al. | |

FOREIGN PATENT DOCUMENTS

| | | |
|---|---|---|
| EP | 3339173 | 6/2018 |
| WO | 2018057117 | 3/2018 |

* cited by examiner

*Primary Examiner* — Anthony D Barfield
(74) *Attorney, Agent, or Firm* — Perkins Coie LLP

(57) ABSTRACT

In-vehicle entertainment (WE) monitor systems can be reconfigurable and modular to improve heat dissipation characteristics and to enable separate removal or installation of one or more parts within the WE monitor system without affecting the rest of the IVE monitor system. A modular system for providing in-vehicle entertainment to passengers on a commercial passenger vehicle includes a main housing, a peripheral housing, and a display panel that are separately removable or installable. A main printed circuit board (PCB) in the main housing is electrically connected to a secondary PCB in the peripheral housing via the first data cable and the secondary PCB is electrically connected to the display panel via the second data cable in a series configuration.

20 Claims, 7 Drawing Sheets

RECONFIGURABLE MODULAR IN-VEHICLE ENTERTAINMENT MONITOR SYSTEMS

TECHNICAL FIELD

This document is directed generally to in-vehicle entertainment monitor systems in commercial passenger vehicles.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes exemplary in-vehicle entertainment (IVE) monitor systems that can have a reconfigurable design and/or a modular design that can allow a person to upgrade or replace parts of an IVE monitor system without affecting the rest of the IVE monitor system.

An exemplary reconfigurable modular system is described for providing in-vehicle entertainment to passengers on a commercial passenger vehicle, where the reconfigurable modular system comprises a main housing, a peripheral housing, and a display panel. The main housing is configured for inclusion within a structure located in the commercial passenger vehicle. The main housing comprises a main printed circuit board (PCB), and one or more openings in a surface of the main housing, where a first end of a first data cable is configured to connect to the main PCB via one of the one or more openings. The peripheral housing is configured for mounting to a rear portion of the structure. The peripheral housing comprises a secondary PCB electrically and mechanically coupled to a plurality of input/output (I/O) ports located on a front surface of the peripheral housing, where the front surface of the peripheral housing is positioned to face away from the structure after the peripheral housing is affixed within the structure, a first opening in a surface of the peripheral housing through which a second end of the first data cable is configured to connect to the secondary PCB, and a second opening in the surface of the peripheral housing through which a first end of a second data cable is configured to connect to the secondary PCB. The display panel is configured for mounting to the rear portion of the structure, where a second end of the second data cable is configured to connect to the display panel. The main housing, the peripheral housing, and the display panel are separately removable or installable, and the main PCB is electrically connected to the secondary PCB via the first data cable and the secondary PCB is electrically connected to the display panel via the second data cable in a series configuration.

In some embodiments, the system further comprises a shroud configured for mounting to the rear portion of the structure, where a top central region of the shroud includes a first opening within which the display panel is disposed, and where the shroud includes a second opening within which the peripheral housing is disposed with the front surface of the peripheral housing being accessible via the second opening. In some embodiments, the system further comprises a trackpad configured for mounting to the rear portion of the structure and disposed within a third opening in the shroud, where the trackpad is electrically connected via a third data cable to the secondary PCB. In some embodiments, the peripheral housing is located adjacent to the display panel.

In some embodiments, a first end of one or more power and data cables are configured to connect to the main PCB via the one or more openings in the surface of the main housing. In some embodiments, the one or more power and data cables includes an Ethernet cable through which the main PCB is configured to receive audio and video content from a server located in the commercial passenger vehicle, and the one or more power and data cables includes a power cable through which the main PCB is configured to receive electrical power. In some embodiments, the first data cable includes a USB Type-C cable, a Thunderbolt cable, or a DisplayPort cable, and where the second data cable includes an embedded DisplayPort (eDP) cable.

In some embodiments, the main housing is configured for mounting to the rear portion of the structure. In some embodiments, the first opening and the second opening of the peripheral housing comprise a single opening. In some embodiments, the display panel is a touch panel.

This patent application also describes an exemplary method of installing a modular system for providing in-vehicle entertainment to passengers on a commercial passenger vehicle. The method comprises installing a main housing in a structure located in the commercial passenger vehicle, where the main housing comprises: a main printed circuit board (PCB), and one or more openings in a surface of the main housing; connecting a first end of a first data cable to the main PCB via one of the one or more openings. The method also includes mounting a peripheral housing to a rear portion of the structure. The peripheral housing comprises a secondary PCB electrically and mechanically coupled to a plurality of input/output (I/O) ports located on a front surface of the peripheral housing, where the front surface of the peripheral housing is positioned to face away from the structure after the peripheral housing is mounted to the rear portion of the structure. The peripheral housing also comprises a first opening and a second opening in a surface of the peripheral housing. The method also includes connecting a second end of the first data cable to the secondary PCB through the first opening, connecting a first end of a second data cable to the secondary PCB through the second opening, mounting a display panel to the rear portion of the structure, and connecting a second end of the second data cable to the display panel. The main housing, the peripheral housing, and the display panel are separately removable or installable, and the main PCB is electrically connected to the secondary PCB via the first data cable and the secondary PCB is electrically connected to the display panel via the second data cable in a series configuration.

The above and other aspects and their implementations are described in greater detail in the drawings, the descriptions, and the claims.

DETAILED DESCRIPTION

Currently, airplanes or other commercial vehicles use conventional in-vehicle entertainment (IVE) monitor systems located on a seat to play audio or video content. A conventional IVE monitor system is a standalone device that includes various components of the IVE monitor system packaged together into one housing to comprise an integrated single device. Accordingly, there are several technical drawbacks to the conventional IVE monitor systems. For example, when a maintenance personnel is required to upgrade to any of the components inside the conventional IVE monitor system, it is very difficult, if not impossible, to do so without impacting other components within the conventional IVE monitor system. In the above example, if a bigger display panel is required, most likely the entire IVE monitor system will have to be designed and made again, even if the performance of the existing electronics in the IVE monitor system is sufficient for the bigger display panel.

In another example, if the electronics within the IVE monitor system needs an upgrade for higher performance or lower power consumption while keeping the same display panel, the entire IVE monitor display will have to be designed and made again. Thus, the parts in the conventional IVE monitor display are difficult to replace or upgrade, which can add significant cost to customers of the conventional IVE monitor system. Conventional IVE monitor systems also prohibit the reuse of similar components in different models in order to lower the production cost for manufacturers.

Furthermore, conventional IVE monitor systems tend to generate significant heat at least because the various components of the IVE monitor system are integrated into a single device. While active or passive cooling options can be added to dissipate heat in conventional IVE monitor systems, such designs can increase mechanical design complexity and cost of conventional IVE monitor system. Furthermore, the heat generated by a conventional IVE monitor system can deteriorate the performance or lifespan of the various components within the conventional IVE monitor system.

To overcome at least these technical drawbacks, among others, this patent document describes exemplary IVE monitor systems that can have a reconfigurable design and a modular design. One of the technical benefits of the exemplary IVE monitor system is that the various parts of the exemplary IVE monitor system can be easily upgraded or replaced without affecting the other parts of the IVE monitor system. Furthermore, compared to the conventional integrated IVE monitor system, the exemplary modular IVE monitor system has improved heat dissipation characteristics at least because the various components of the exemplary IVE monitor system can be separated and located in different places in, for example, a seat of a commercial passenger vehicle.

Figure 1A:
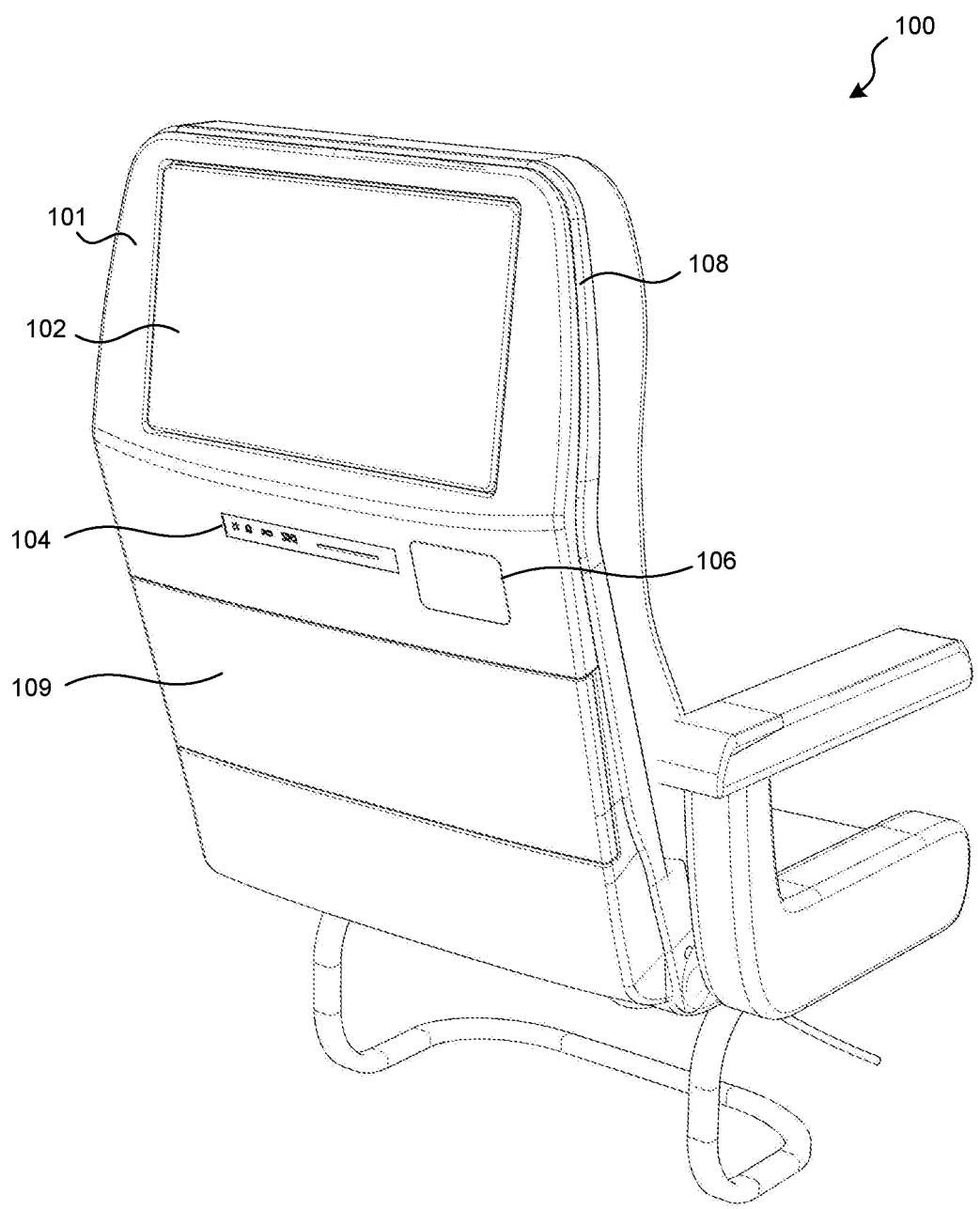
FIGS. 1A-1E show different views of an exemplary in-vehicle entertainment (IVE) monitor system installed on or in a structure in a commercial passenger vehicle.

FIG. 1A shows an exemplary IVE monitor system 100 installed on or in a structure (e.g., seatback 108) of a commercial passenger vehicle, such as an airplane, train, a ship, or a bus. The IVE monitor system 100 includes a reconfigurable modular design that separates components into smaller assemblies. The IVE monitor system 100 includes a display panel 102 that can be mounted to the seatback 108 of a seat assembly, where the seat assembly includes a seat on which a person can sit. The display panel 102 located within a shroud 101 that is mounted to the rear of the seatback 108 and that extends from a top of the seatback 108 to middle region of the seatback. In some embodiments, the display panel 102 can be the touch panel. The shroud 101 and the display panel 102 can have thin profiles to minimize the thickness of the seatback 108. The shroud 101 can surround the display panel 102. A top central region of the shroud 101 can include a rectangular opening so that the display panel 102 can be disposed or located within the opening to enable a person to view content displayed on the display panel 102. In some embodiments where the display panel 102 is a touch panel, the opening in the shroud 101 can allow a person to interact with the touch display panel 102.

In some embodiments, the IVE monitor system 100 may optionally include a trackpad 106 that can be located below the display panel 102 and can be mounted to the seatback 102. The trackpad 106 is a separate device from the display panel 102 and the peripheral assembly 104. The trackpad 106 can allow a person to interact with the content displayed on the display panel 102 by, for example, moving a cursor displayed on a graphical user interface (GUI) of the display panel 102 and selecting an audio or video content to be played on the display panel 102. The shroud 101 may extend below the display 102 and may include another opening within which the optional touchpad 106 may be disposed. As shown in FIG. 1C, the trackpad 106 includes a cable 118 that is connected the secondary PCB in the peripheral assembly 104 via an opening in the bottom surface or the rear surface of the housing of the peripheral assembly 104. In some embodiments, the trackpad 106 may be located on an armrest of a seat.

The IVE monitor system 100 includes a peripheral assembly 104 that can include the input/output (I/O) devices in it, e.g., USB, audio, electronic card reader, etc., The peripheral assembly 104 is a separate device or component from the display panel 102. The peripheral assembly 104 can be located below the display panel 102 and can be mounted to the seatback 102. The shroud 101 may extend below the display 102 and may include another opening so that a front portion of a housing of the peripherical assembly 104 that includes the openings for the I/O ports can be disposed or located within the opening and can be accessible via the opening. As shown in FIG. 1A, the opening in the shroud 101 for the peripheral assembly 104 and the peripheral assembly 104 can have a horizontal orientation. The I/O ports of the peripheral assembly 104 can be disposed horizontally on the front portion of the housing of the peripheral assembly 104. For example, the audio port(s), USB port(s), electronic card reader can be located one after another along a length-wise direction on the front portion of the housing of the peripheral assembly 104.

FIG. 1A shows that the peripheral assembly 104 is located below the display assembly 102. In some embodiments, the peripheral assembly 104 can be located adjacent to (e.g., to left or right of) the display panel 102 and disposed within another opening in the shroud 101. For example, an additional opening in the shroud 101 located to the right of the display panel 102 can allow the peripheral assembly 104 to be disposed or located within the additional opening. In embodiments where the peripheral assembly 104 can be located adjacent to the display panel 102 (e.g., to the left or the right to the display panel 102), the additional opening in the shroud 101 for the peripheral assembly 104 and the peripheral assembly 104 can have a vertical orientation to allow the peripheral assembly 104 to be located next to the display panel 102.

The peripheral assembly 104 includes a housing within which a secondary printed circuit board (PCB) is located. The secondary PCB is electrically and mechanically coupled to the I/O ports. The secondary PCB may include microcontrollers that can send and receive data from one or more devices plugged into the I/O ports. For example, a USB microcontroller can be electrically coupled to the USB I/O port in the peripheral assembly 104 so that a USB device plugged into a port of the USB I/O port can send data to and receive data from the USB microcontroller. In another example, an electronic card microcontroller can be electrically coupled to the electronic card reader I/O port in the peripheral assembly 104. When an electronic card (e.g., credit card) is inserted in or swiped through the electronic card reader I/O port, the electronic card microcontroller can send data to and receive data from the electronic card.

The shroud 101 includes openings for the display panel 102, the peripheral assembly 104, and the optional trackpad 106. One or more additional rear panels can be installed below the shroud 101. For example, a rear panel may be an expandable seatback tray 109 can be located below the shroud 101.

Figure 1B:
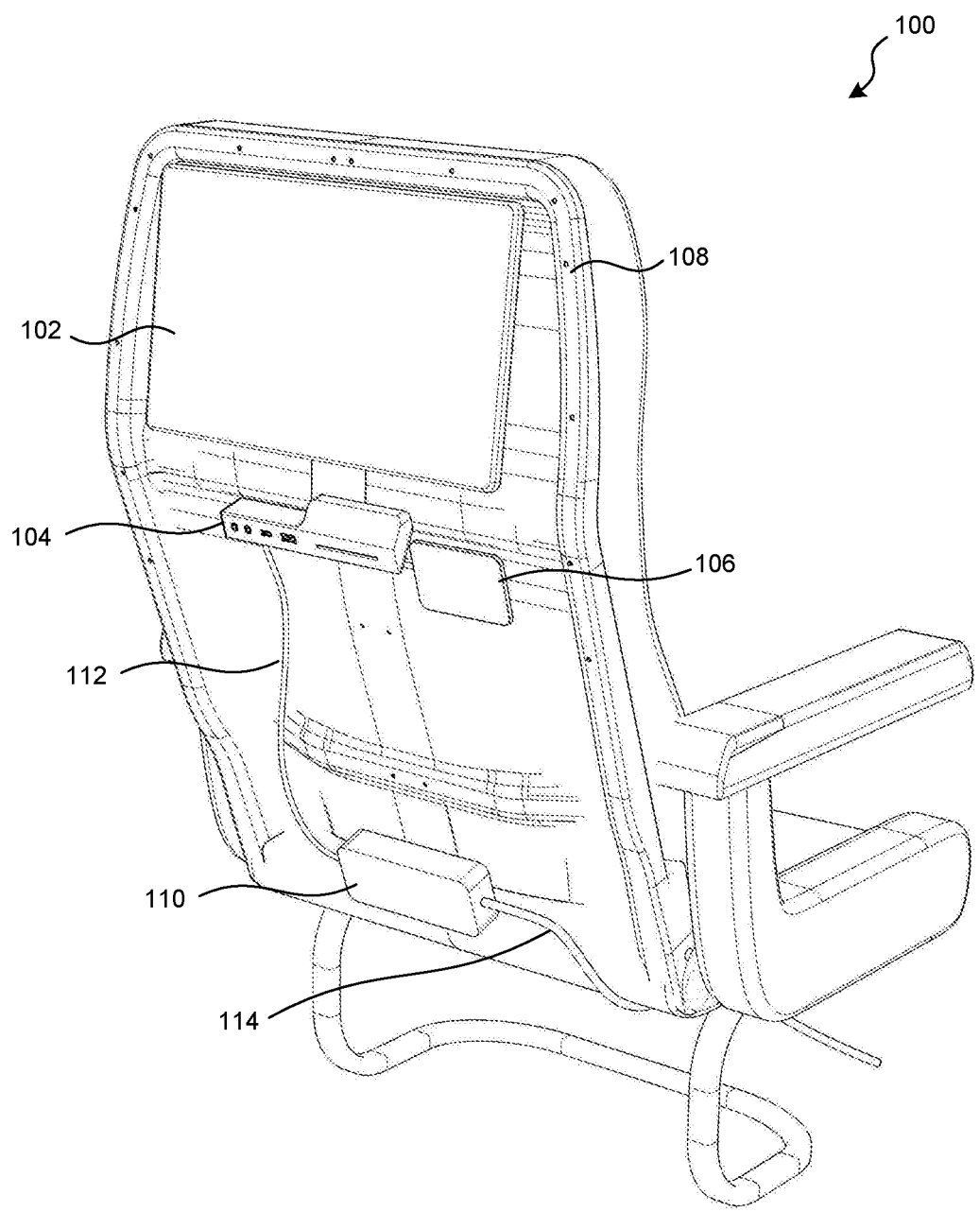
Figure 1C:
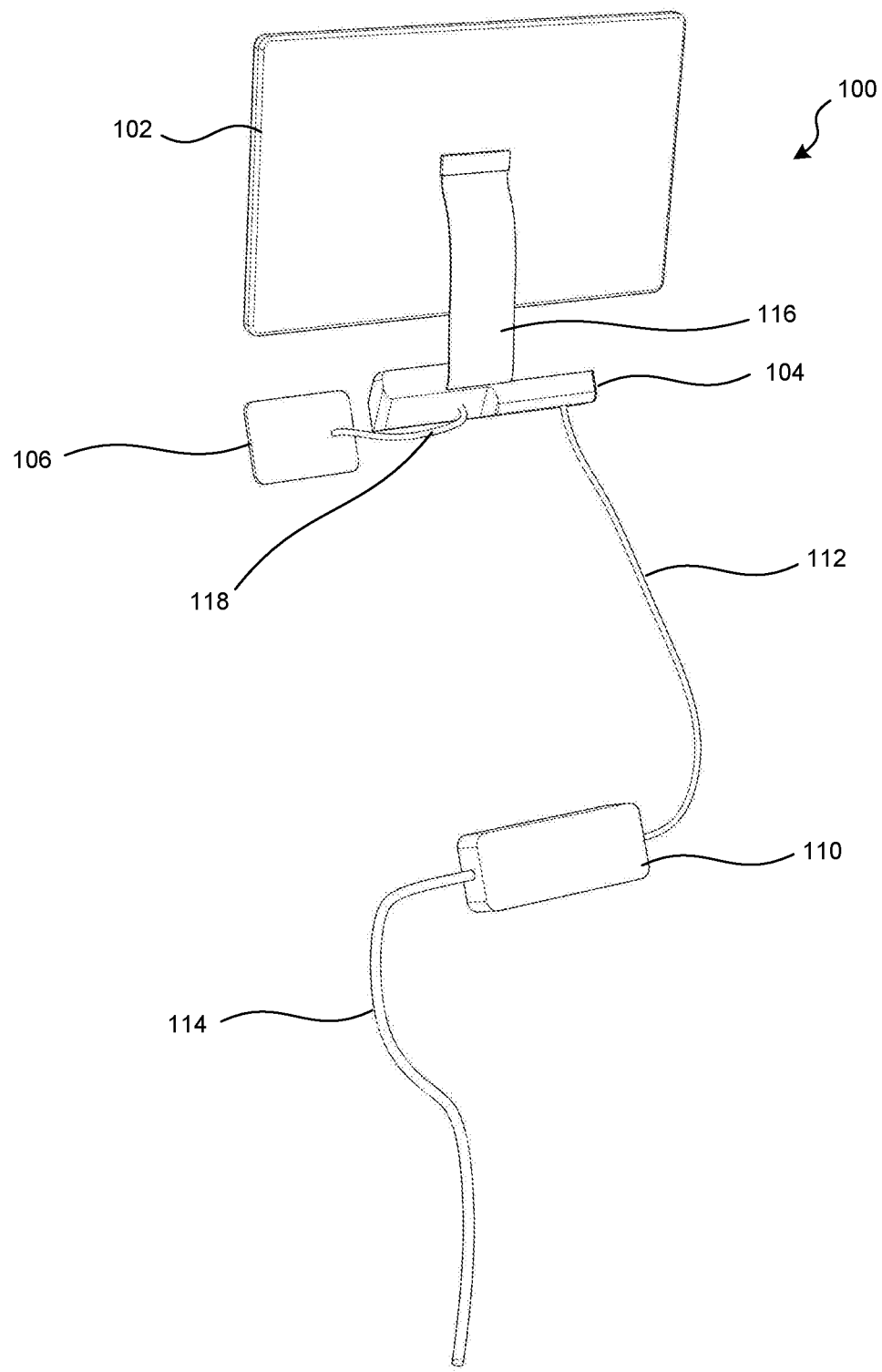

FIG. 1B shows another view of the exemplary IVE monitor system 100 installed on or in a seatback of a commercial passenger vehicle without the shroud 101 and one or more additional rear panels. FIG. 1B shows that the IVE monitor system 100 includes a main PCB assembly 110. The main PCB assembly 110 is a separate device or component from the peripheral assembly 104 and from the display panel 102. Thus, at least the main PCB assembly 110, the peripheral assembly 104, the display panel 102, and the optional trackpad 106 are separably or separately removable and installable. The main PCB assembly 110 can be located below the peripheral assembly 104 towards a bottom portion of the seat 108 and behind a panel that covers the rear portion of the seatback 108. The main PCB assembly 110 can include a housing that can be mounted to the seatback 108. In some embodiments, the main PCB assembly 110 can be located below the seat 108.

The housing of the main PCB assembly 110 can include the PCB motherboard in it. The housing of the main PCB assembly 110 may have a rectangular cuboid-like shape. The PCB motherboard performs the computations and/or display related operations. In some embodiments, the PCB motherboard may include a processor that can communicate with the microcontrollers on the secondary PCB located in the peripheral assembly 104 via a data cable 112 (e.g., USB Type-C, Thunderbolt, or DisplayPort cable) attached to the PCB motherboard and the secondary PCB. The surface of the housing of the main PCB assembly 110 and the bottom surface or the rear surface of the housing of the peripheral assembly 104 can include an opening to enable the connectors of the data cable 112 to be attached to the PCB motherboard and the secondary PCB, respectively. The housing of the main PCB assembly 110 includes one or more additional openings to connect to one or more cables 114 that can provide power to the PCB motherboard and can send data to and received data from the PCB motherboard. In some embodiments, the one or more cables can be separate power cable and data cable (e.g., Ethernet cable). In some embodiments, the housing for the main PCB assembly may include a single opening through which one end of the cables 112 and 114 can be connected to the PCB motherboard.

FIG. 1C shows a rear view of the exemplary IVE monitor system 100 without the seat within which the IVE monitor system 100 can be installed. FIG. 1C shows that a cable 116 connects the display panel 102 to the peripheral assembly 104. A top surface or a rear surface of the housing of the peripheral assembly 104 can include an opening that enables the secondary PCB in the peripheral assembly 104 to be connected to a first end of the cable 116. The second end of the cable 116 can be connected to the display panel 102 via a connector. In an example implementation, the cable 116 that connects the display panel 102 to the peripheral assembly 104 may be an embedded DisplayPort (eDP) cable. In some embodiments, a single opening in a rear surface of the peripheral housing 104 can include a single opening through which the cables 112 and 116 connect to the secondary PCB.

As shown in FIG. 1C, the IVE monitor system 100 can be connected in series from main PCB assembly 110 to peripheral assembly 104 and from the peripheral assembly 104 to the display panel 102. Each of the main PCB assembly 110, peripheral assembly 104, and display panel 102 can have its own housing and can be considered a standalone unit or device.

Figure 1D:
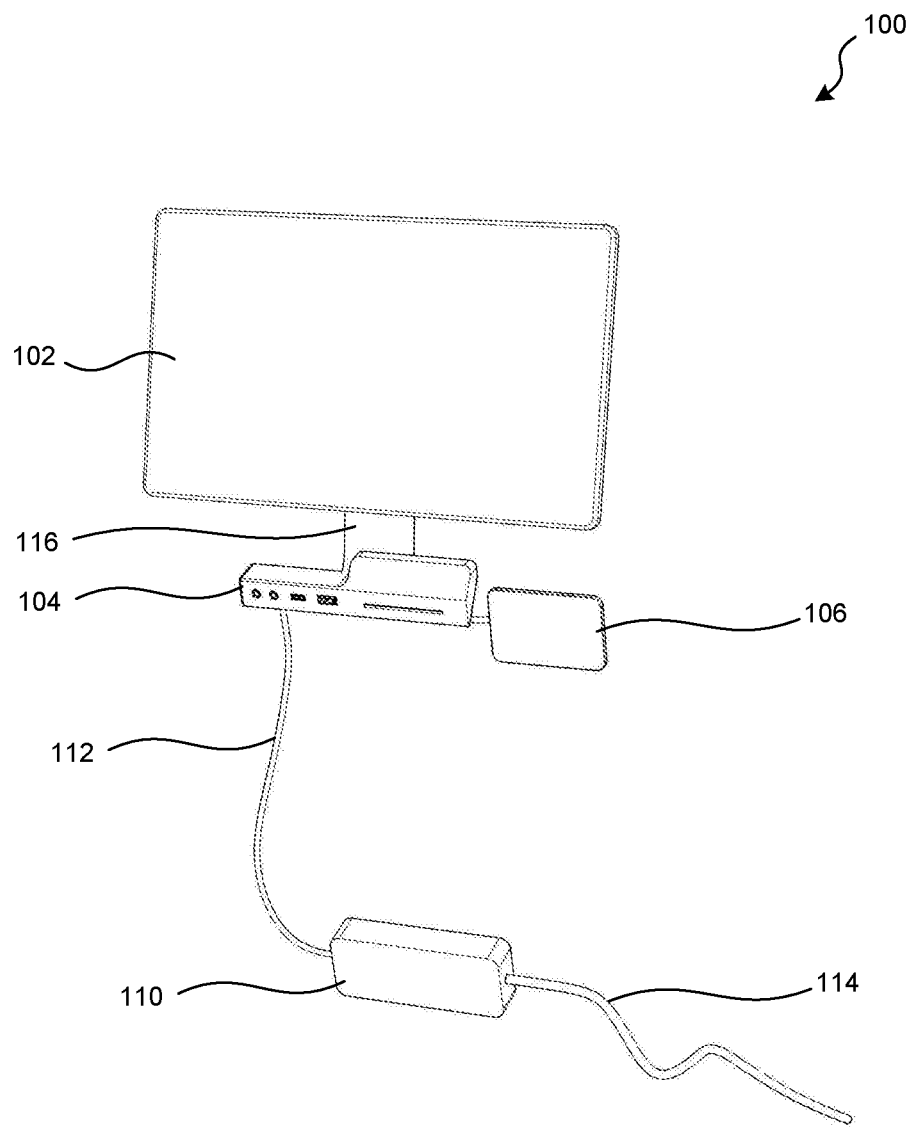
Figure 1E:
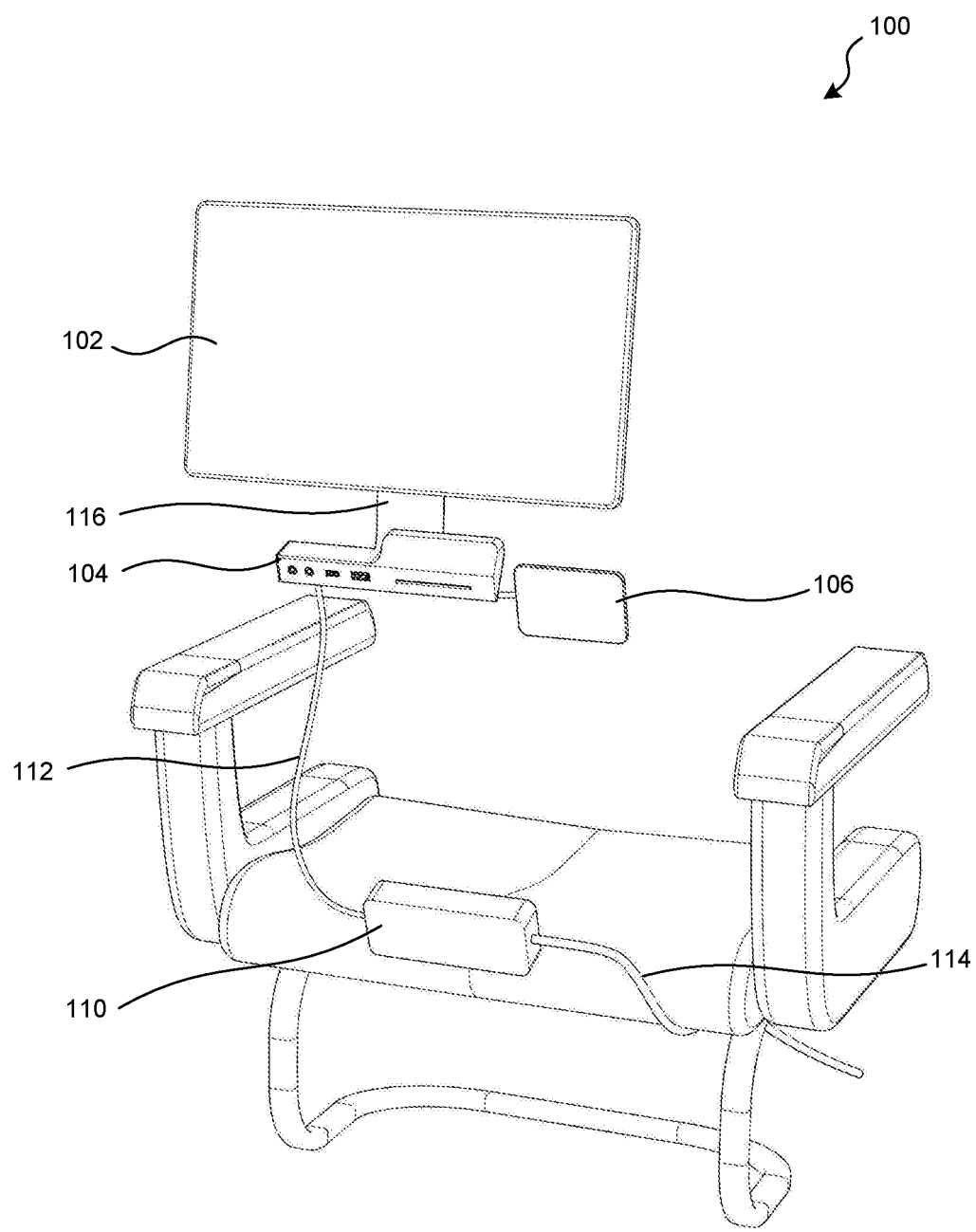

FIGS. 1D and 1E shows additional views of the exemplary IVE monitor system 100. FIG. 1D shows a front view of the IVE monitor system 100 without the structure (e.g., seat) within which the IVE monitor system 100 can be installed. FIG. 1E shows a front view of the IVE monitor system 100 without a portion of the structure (e.g., seatback 108 of the seat).

FIGS. 1B to 1E show an exemplary shape of the peripheral assembly 104. One end of the housing for the peripheral assembly 104 can have a rectangular cuboid-like shape and the opposite end of the peripheral assembly 104 that includes the electronic card reader I/O port can have an elongated shape that can extend at an oblique angle towards the display panel 102. The oblique elongated shape of the housing for the electronic card reader I/O port enables the peripheral assembly 104 to have a thin profile so that it can fit between the seatback 108 and the shroud 101 and so that an electronic card can be inserted in or swiped through the electronic card reader I/O port.

Figure 2:
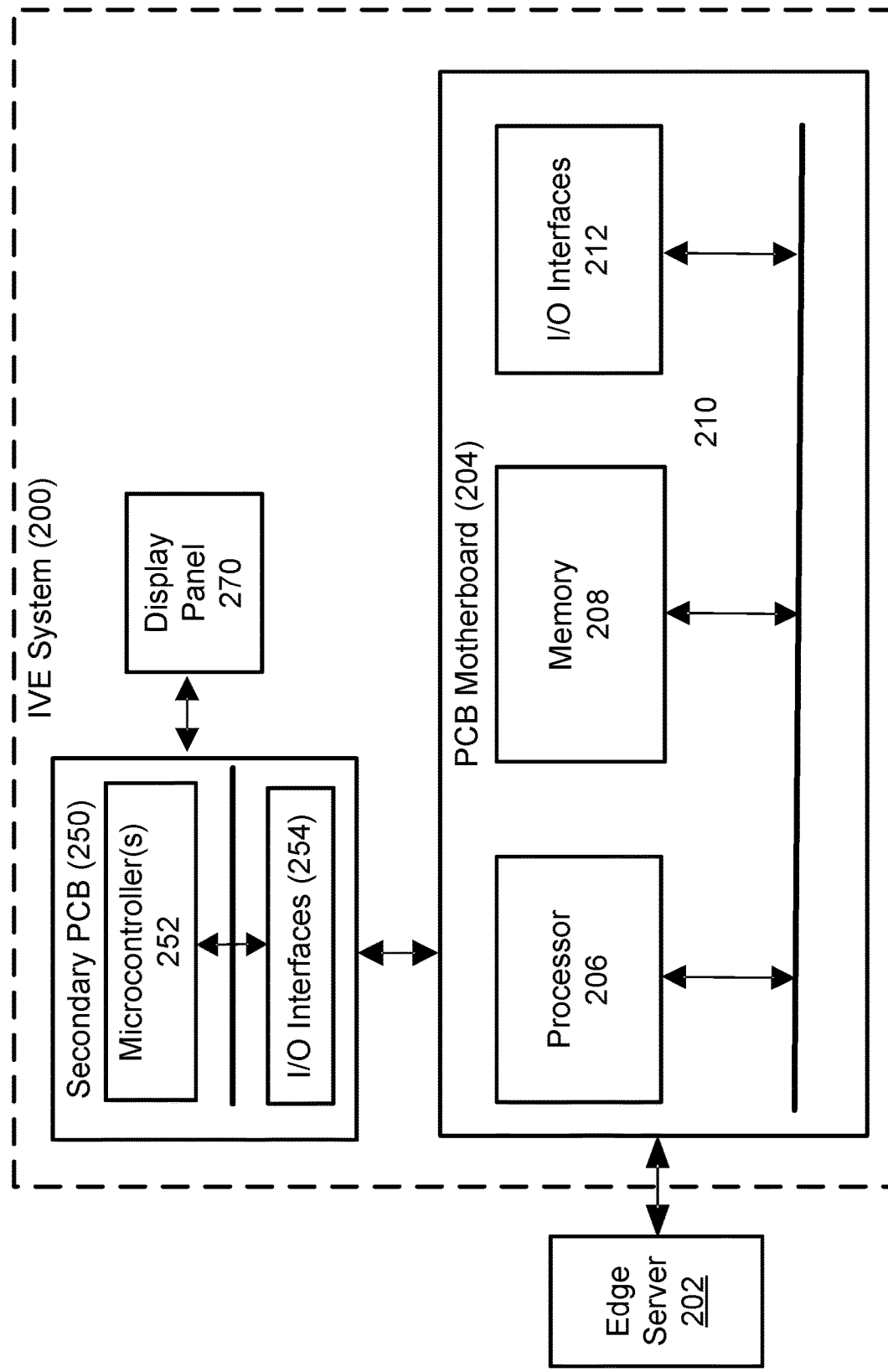
FIG. 2 shows a block diagram of the exemplary IVE monitor system 200.

FIG. 2 shows a block diagram of the exemplary IVE monitor system 200. The PCB motherboard 204 in the main PCB Assembly the device may include a processor 206 (e.g., a central processing unit, also called a central processor or main processor, is the electronic circuitry within a computer that carries out the instructions of a computer program by performing the basic arithmetic, logic, controlling, and input/output operations specified by the instructions) and a memory 208, which are connected to a bus 210. In an example, the bus 210 may be a Controller Area Network (CAN) bus. In another example, the bus 210 may be an avionics data bus (e.g., ARINC 429, 629 or 664). The processor 206 and memory 208 are further connected, via the bus 210, to input/output (I/O) interfaces 212. In an example implementation, the I/O interfaces 212 may include a power connector, an Ethernet connector, and a USB Type-C connector. The power connector may be connected to a cable that provides electrical power to the PCB motherboard, the Ethernet connector that may be connected to an Ethernet cable that enables the PCB motherboard to send data to and receive data from the edge server 202, and the USB Type-C connector can be connected to a cable that is connected to the secondary PCB 250 located in the peripheral assembly The secondary PCB 250 may include one or more microcontrollers to operate one or more I/O ports (e.g., USB device port, headphone/audio jack, and/or electronic card reader). The secondary PCB 250 also includes multiple I/O interfaces 254. For example, the I/O interfaces may include a USB device, headphone/audio jack, and/or electronic card reader. The I/O interface may also include, for example, a USB Type-C connector that can be used to connect the secondary PCB 250 to the PCB motherboard 204. The I/O interface may also include a connector that can be used to connect the secondary PCB 250 to the display panel 270 via a cable (e.g., eDP cable).

In an example implementation, audio and video content can be sent by the edge server 202 to the PCB motherboard 204, where the processor 206 sends the audio and video content to the secondary PCB 250 via the USB Type-C cable. The secondary PCB may include an audio/video microcontroller that receives the audio and video content. The audio/video microcontroller sends the video content via the eDP cable to the display panel 270 and sends audio content to the headphone/audio jack of the peripheral assembly.

The exemplary modular IVE monitor systems described in this patent document can allow a person to separately upgrade one or more portion of the IVE monitor system without affecting or replacing the rest of the parts of the IVE monitor system. For example, a person can upgrade to a bigger display assembly but can keep the rest of the system the same. Therefore, compared to conventional IVE monitors, the exemplary modular IVE monitor system can dramatically reduce cost of upgrade and efforts needed to replace parts. The exemplary modular IVE monitor system can also allow a person to upgrade the main PCB assembly with better performance or lower power consumption without changing the other parts of the system. When different I/O ports are needed, e.g., USB type-C, a person can change the peripheral assembly without changing or paying for another display or PCB assembly. Compared to conventional IVE monitor systems, the exemplary modular IVE monitor system can also lower cost for manufacturers at least because separate components can be easily manufactured and parts within the exemplary IVE monitor system can be easily replaced without replacing the entire monitor system. Since the same assembly, e.g., main PCB assembly, can be used in different configurations, the mass production quantity can be higher which results to a lower production cost. In the case of service or repair, e.g., broken USB port, individual assembly can be replaced, which can reduce the maintenance cost greatly.

Figure 3:
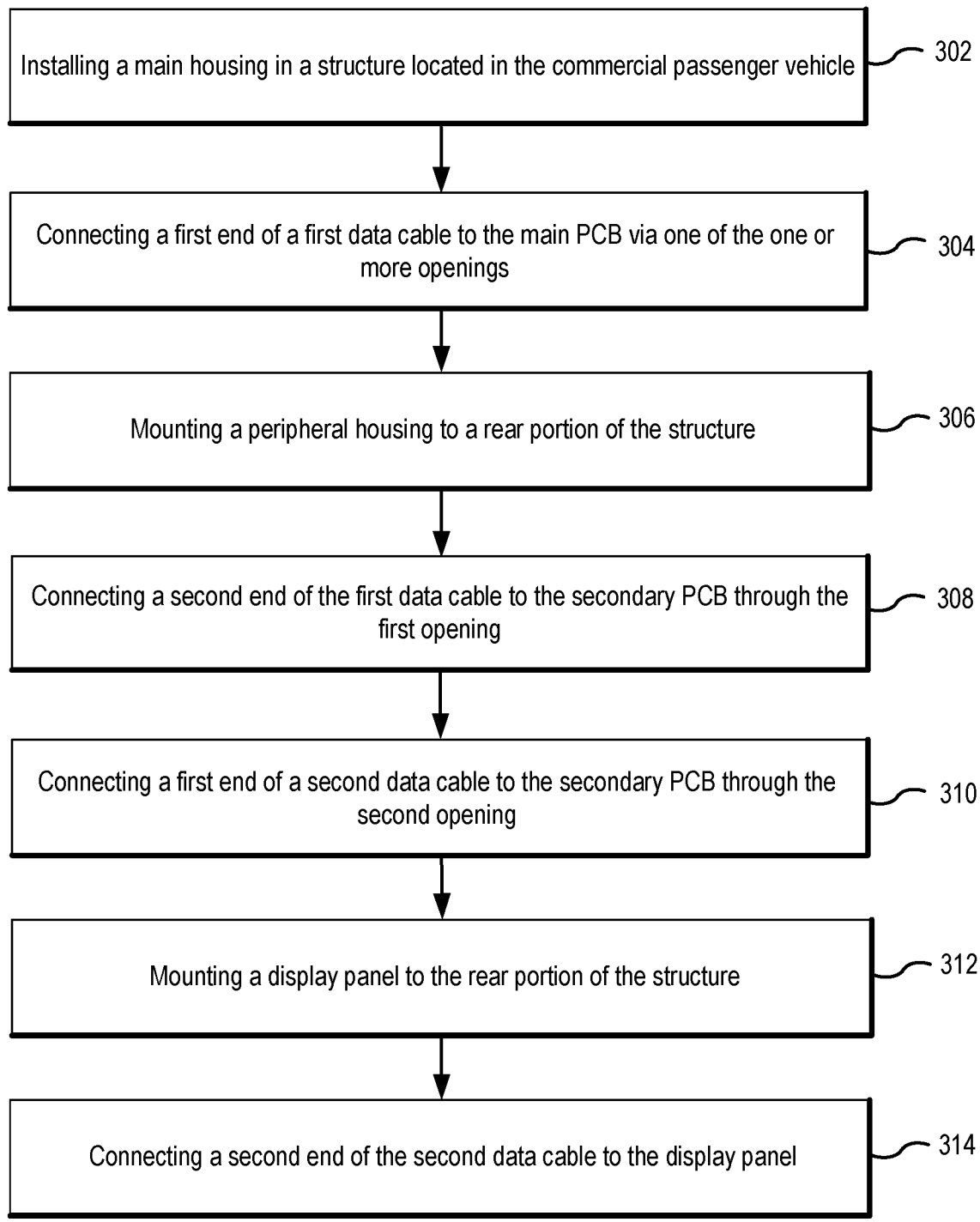
FIG. 3 shows an exemplary flow diagram for installing the exemplary modular IVF monitor system in a commercial passenger vehicle.

FIG. 3 shows an exemplary flow diagram for installing the exemplary modular IVF monitor system in a commercial passenger vehicle. At the installing operation 302, a main housing is installed in a structure located in the commercial passenger vehicle. The main housing comprises a main printed circuit board (PCB), and one or more openings in a surface of the main housing. At the connecting operation 304, a first end of a first data cable is connected to the main PCB via one of the one or more openings. At the mounting operation 306, a peripheral housing is mounted to a rear portion of the structure. The peripheral housing comprises a secondary PCB electrically and mechanically coupled to a plurality of input/output (I/O) ports located on a front surface of the peripheral housing, where the front surface of the peripheral housing is positioned to face away from the structure after the peripheral housing is mounted to the rear portion of the structure. The surface of the peripheral housing also includes a first opening and a second opening.

At the connecting operation 308, a second end of the first data cable is connected to the secondary PCB through the first opening. At the connecting operation 310, a first end of a second data cable is connected to the secondary PCB through the second opening. At the mounting operation 312, a display panel is mounted to the rear portion of the structure. The main housing, the peripheral housing, and the display panel are separately removable or installable. At the connecting operation 314, a second end of the second data cable is connected to the display panel. The main PCB is electrically connected to the secondary PCB via the first data cable and the secondary PCB is electrically connected to the display panel via the second data cable in a series configuration.

In some embodiments, the method of FIG. 3 further includes mounting a shroud to the rear portion of the structure, where a top central region of the shroud includes a first opening within which the display panel is disposed, and where the shroud includes a second opening within which the peripheral housing is disposed with the front surface of the peripheral housing being accessible via the second opening.

In some embodiments, the method of FIG. 3 further includes mounting a trackpad to the rear portion of the structure and disposed within a third opening in the shroud, and connecting the trackpad via a third data cable to the secondary PCB.

In some embodiments, the peripheral housing is located adjacent to the display panel.

In some embodiments, a first end of one or more power and data cables connect to the main PCB via the one or more openings in the surface of the main housing.

In some embodiments, the one or more power and data cables includes an Ethernet cable through which the main PCB receives audio and video content from a server located in the commercial passenger vehicle, and where the one or more power and data cables includes a power cable through which the main PCB receives electrical power.

In some embodiments, the first data cable includes a USB Type-C cable, a Thunderbolt cable, or a DisplayPort cable, and the second data cable includes an embedded DisplayPort (eDP) cable. In some embodiments, the main housing is mounted to the rear portion of the structure. In some embodiments, the first opening and the second opening of the peripheral housing comprise a single opening. In some embodiments, the display panel is a touch panel.

In this patent document, a cable can be connected to a device directly, for example, via a connector, or a cable can be connected to a device indirectly, for example, via an electromagnetic interference (EMI) filter device. In this patent document, a data cable may transmit audio and/or video content and may be used to send power to a device (e.g., Power over-Ethernet (PoE) cable).

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A reconfigurable modular system for providing in-vehicle entertainment to passengers on a commercial passenger vehicle, the reconfigurable modular system comprising:
a main housing configured for inclusion within a structure located in the commercial passenger vehicle, wherein the main housing comprises:
a main printed circuit board (PCB), and
one or more openings in a surface of the main housing, wherein a first end of a first data cable is configured to connect to the main PCB via one of the one or more openings;
a peripheral housing configured for mounting to a rear portion of the structure, wherein the peripheral housing comprises:
a secondary PCB electrically and mechanically coupled to a plurality of input/output (I/O) ports located on a front surface of the peripheral housing, wherein the front surface of the peripheral housing is positioned to face away from the structure after the peripheral housing is affixed within the structure,
a first opening in a surface of the peripheral housing through which a second end of the first data cable is configured to connect to the secondary PCB, and
a second opening in the surface of the peripheral housing through which a first end of a second data cable is configured to connect to the secondary PCB; and
a display panel configured for mounting to the rear portion of the structure, wherein a second end of the second data cable is configured to connect to the display panel,
wherein the main housing, the peripheral housing, and the display panel are separately removable or installable, and
wherein the main PCB is electrically connected to the secondary PCB via the first data cable and the secondary PCB is electrically connected to the display panel via the second data cable in a series configuration.

2. The system of claim 1, further comprising:
a shroud configured for mounting to the rear portion of the structure,
wherein a top central region of the shroud includes a first opening within which the display panel is disposed, and
wherein the shroud includes a second opening within which the peripheral housing is disposed with the front surface of the peripheral housing being accessible via the second opening.

3. The system of claim 1, further comprising:
a trackpad configured for mounting to the rear portion of the structure and disposed within a third opening in the shroud, wherein the trackpad is electrically connected via a third data cable to the secondary PCB.

4. The system of claim 1, wherein the peripheral housing is located adjacent to the display panel.

5. The system of claim 1, wherein a first end of one or more power and data cables are configured to connect to the main PCB via the one or more openings in the surface of the main housing.

6. The system of claim 5,
wherein the one or more power and data cables includes an Ethernet cable through which the main PCB is configured to receive audio and video content from a server located in the commercial passenger vehicle, and
wherein the one or more power and data cables includes a power cable through which the main PCB is configured to receive electrical power.

7. The system of claim 1,
wherein the first data cable includes a USB Type-C cable, a Thunderbolt cable, or a DisplayPort cable, and
wherein the second data cable includes an embedded DisplayPort (eDP) cable.

8. The system of claim 1, wherein the main housing is configured for mounting to the rear portion of the structure.

9. The system of claim 1, wherein the first opening and the second opening of the peripheral housing comprise a single opening.

10. The system of claim 1, wherein the display panel is a touch panel.

11. A method of installing a modular system for providing in-vehicle entertainment to passengers on a commercial passenger vehicle, the method comprising:
- installing a main housing in a structure located in the commercial passenger vehicle, wherein the main housing comprises:
  - a main printed circuit board (PCB), and
  - one or more openings in a surface of the main housing;
- connecting a first end of a first data cable to the main PCB via one of the one or more openings;
- mounting a peripheral housing to a rear portion of the structure, wherein the peripheral housing comprises:
  - a secondary PCB electrically and mechanically coupled to a plurality of input/output (I/O) ports located on a front surface of the peripheral housing, wherein the front surface of the peripheral housing is positioned to face away from the structure after the peripheral housing is mounted to the rear portion of the structure, and
  - a first opening and a second opening in a surface of the peripheral housing;
- connecting a second end of the first data cable to the secondary PCB through the first opening;
- connecting a first end of a second data cable to the secondary PCB through the second opening;
- mounting a display panel to the rear portion of the structure, wherein the main housing, the peripheral housing, and the display panel are separately removable or installable; and
- connecting a second end of the second data cable to the display panel, wherein the main PCB is electrically connected to the secondary PCB via the first data cable and the secondary PCB is electrically connected to the display panel via the second data cable in a series configuration.

12. The method of claim 11, further comprising:
mounting a shroud to the rear portion of the structure, wherein a top central region of the shroud includes a first opening within which the display panel is disposed, and
wherein the shroud includes a second opening within which the peripheral housing is disposed with the front surface of the peripheral housing being accessible via the second opening.

13. The method of claim 11, further comprising:
mounting a trackpad to the rear portion of the structure and disposed within a third opening in the shroud; and
connecting the trackpad via a third data cable to the secondary PCB.

14. The method of claim 11, wherein the peripheral housing is located adjacent to the display panel.

15. The method of claim 11, wherein a first end of one or more power and data cables connect to the main PCB via the one or more openings in the surface of the main housing.

16. The method of claim 15,
wherein the one or more power and data cables includes an Ethernet cable through which the main PCB receives audio and video content from a server located in the commercial passenger vehicle, and
wherein the one or more power and data cables includes a power cable through which the main PCB receives electrical power.

17. The method of claim 11,
wherein the first data cable includes a USB Type-C cable, a Thunderbolt cable, or a DisplayPort cable, and
wherein the second data cable includes an embedded DisplayPort (eDP) cable.

18. The method of claim 11, wherein the main housing is mounted to the rear portion of the structure.

19. The method of claim 11, wherein the first opening and the second opening of the peripheral housing comprise a single opening.

20. The method of claim 11, wherein the display panel is a touch panel.

* * * * *